(12) United States Patent
Hirsch

(10) Patent No.: US 8,556,129 B1
(45) Date of Patent: Oct. 15, 2013

(54) POWDER DISPENSER ASSEMBLY

(76) Inventor: Gary Wayne Hirsch, Cynthiana, IN (US)

( * ) Notice: Subject to any disclaimer, the term of this patent is extended or adjusted under 35 U.S.C. 154(b) by 196 days.

(21) Appl. No.: 13/043,839

(22) Filed: Mar. 9, 2011

(51) Int. Cl.
 *G01F 11/00* (2006.01)
 *G01F 11/20* (2006.01)

(52) U.S. Cl.
 USPC .......................... 222/236; 222/406; 222/410

(58) Field of Classification Search
 USPC ......... 222/236, 406, 410, 412, 413, 342, 352; 198/550.6, 545
 See application file for complete search history.

(56) References Cited

U.S. PATENT DOCUMENTS

| | | | | |
|---|---|---|---|---|
| 1,462,649 A * | 7/1923 | MacLellan | ................ | 366/155.1 |
| 1,463,457 A * | 7/1923 | Beckmann | ................ | 222/80 |
| 1,864,740 A * | 6/1932 | Knapp et al. | ................ | 406/121 |
| 2,577,135 A * | 12/1951 | Langen | ................ | 127/7 |
| 3,059,450 A * | 10/1962 | Mueller et al. | ................ | 62/344 |
| 3,147,144 A * | 9/1964 | Wilhelm | ................ | 118/420 |
| 3,335,911 A * | 8/1967 | Stutz | ................ | 222/640 |
| 3,704,076 A * | 11/1972 | Bodunov et al. | ................ | 415/72 |
| 3,756,434 A * | 9/1973 | Teske | ................ | 414/218 |
| 3,766,664 A * | 10/1973 | Burgin | ................ | 34/182 |
| 4,192,418 A * | 3/1980 | Montgomery | ................ | 198/659 |
| 4,462,740 A * | 7/1984 | Cytra | ................ | 414/220 |
| 4,492,321 A * | 1/1985 | Zoltner | ................ | 222/410 |
| 4,595,128 A * | 6/1986 | Fielding | ................ | 222/252 |
| 4,784,298 A * | 11/1988 | Heep et al. | ................ | 222/350 |
| 5,287,801 A * | 2/1994 | Clark | ................ | 99/451 |
| 5,314,090 A * | 5/1994 | Alexander | ................ | 222/1 |
| 5,472,305 A * | 12/1995 | Ikeda et al. | ................ | 414/219 |
| 5,514,399 A * | 5/1996 | Cordera et al. | ................ | 426/295 |
| 6,325,588 B1 * | 12/2001 | Nolin | ................ | 414/526 |
| 7,487,892 B1 * | 2/2009 | Hirsch | ................ | 222/240 |
| 2010/0236419 A1 * | 9/2010 | Righetti et al. | ................ | 99/289 R |

FOREIGN PATENT DOCUMENTS

EP          51550 A1 *  5/1982

* cited by examiner

*Primary Examiner* — Paul R Durand
*Assistant Examiner* — Vishal Pancholi

(57) ABSTRACT

A powder dispensing assembly is provided for evenly and efficiently metering and dispensing a powder for a desired purpose such as coating a plurality of items with the powder. The assembly includes a container configured for holding a powder. The container has a dispensing aperture. A conduit is coupled to the container and has a receiving aperture in environmental communication with the dispensing aperture of the container. Thus, the conduit is configured to receive the powder dispensed through the dispensing aperture. The conduit includes a dispensing opening configured for passing the powder from the conduit. An auger is positioned in the conduit and a motor is operationally coupled to the auger for moving the powder to the dispensing aperture.

18 Claims, 5 Drawing Sheets

POWDER DISPENSER ASSEMBLY

BACKGROUND OF THE DISCLOSURE

Field of the Disclosure

The disclosure relates to powder dispensing devices and more particularly pertains to a new powder dispensing device for evenly and efficiently metering and dispensing a powder for a desired purpose such as coating a plurality of items with the powder.

SUMMARY OF THE DISCLOSURE

An embodiment of the disclosure meets the needs presented above by generally comprising a container configured for holding a powder. The container has a dispensing aperture. A conduit is coupled to the container and has a receiving aperture in environmental communication with the dispensing aperture of the container. Thus, the conduit is configured to receive the powder dispensed through the dispensing aperture. The conduit includes a dispensing opening configured for passing the powder from the conduit. An auger is positioned in the conduit and a motor is operationally coupled to the auger for moving the powder to the dispensing aperture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
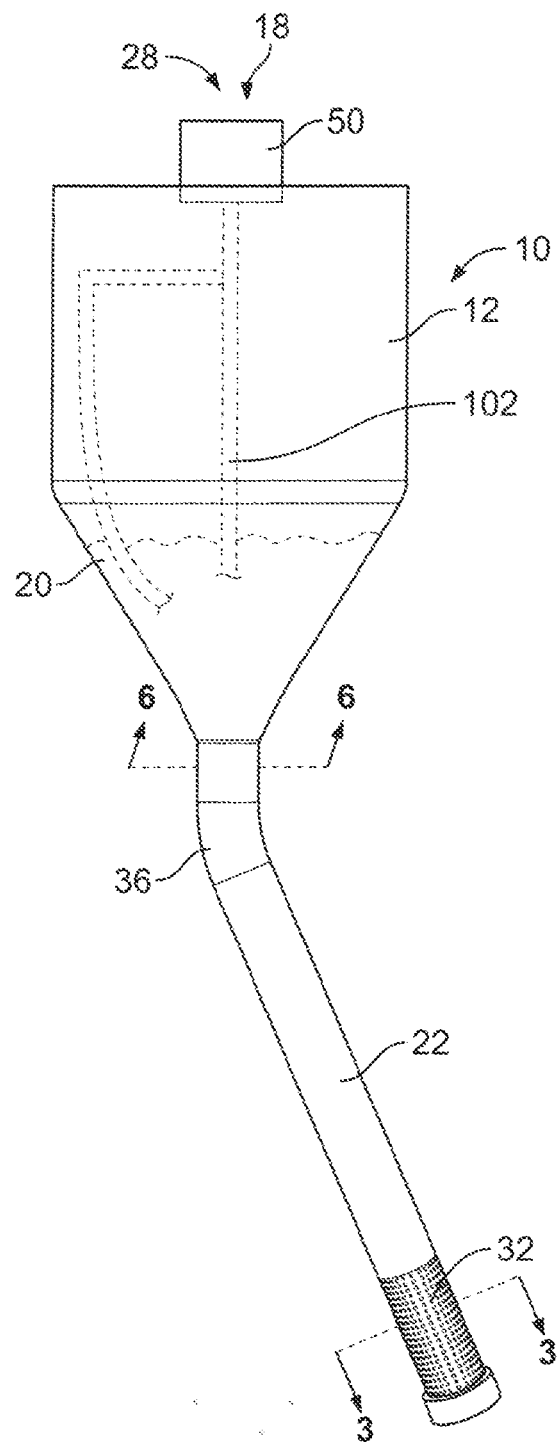
FIG. 1 is a partial cut-away top front side perspective view of a powder dispensing assembly according to an embodiment of the disclosure.

With reference now to the drawings, and in particular to FIGS. 1 through 8 thereof, a new powder dispensing device embodying the principles and concepts of an embodiment of the disclosure and generally designated by the reference numeral 10 will be described.

As best illustrated in FIGS. 1 through 8, the powder dispensing assembly 10 generally comprises a container 12 configured for holding a powder 20. The container has a dispensing aperture 14 typically at a bottom 16 of the container 12. A metering assembly 18 is coupled to and positioned in the container 12 for metering and dispensing the powder 20 from the container 12 through the dispensing aperture 14. The structure of the metering assembly 18 may be consistent with the metering device disclosed in U.S. Pat. No. 7,487,892 issued to the inventor, Gary Wayne Hirsch on Feb. 10, 2009.

A tubular conduit 22 is coupled to the container 12. The conduit 22 has a receiving aperture 24 in environmental communication with the dispensing aperture 14 of the container 12. Thus, the conduit 22 is configured to receive the powder 20 dispensed through the dispensing aperture 14. A dispensing screen 32 is coupled to or integrally formed in the conduit 22. The dispensing screen 32 is configured for dispensing the powder 20 from the conduit 22.

Figure 3:
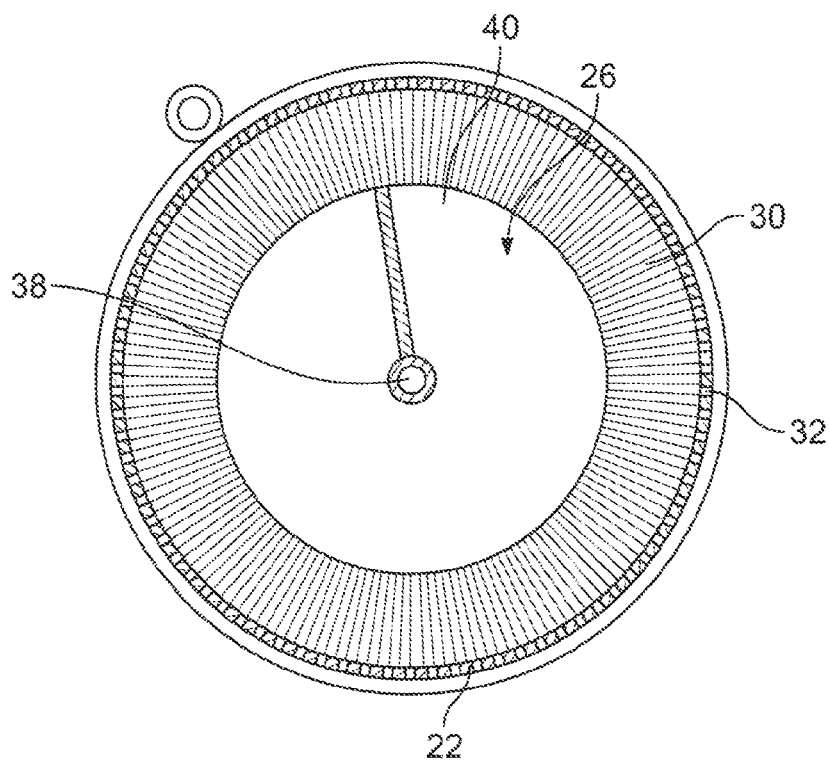
FIG. 3 is a cross-sectional view of an embodiment of the disclosure taken along line 3-3 of FIG. 1.
Figure 4:
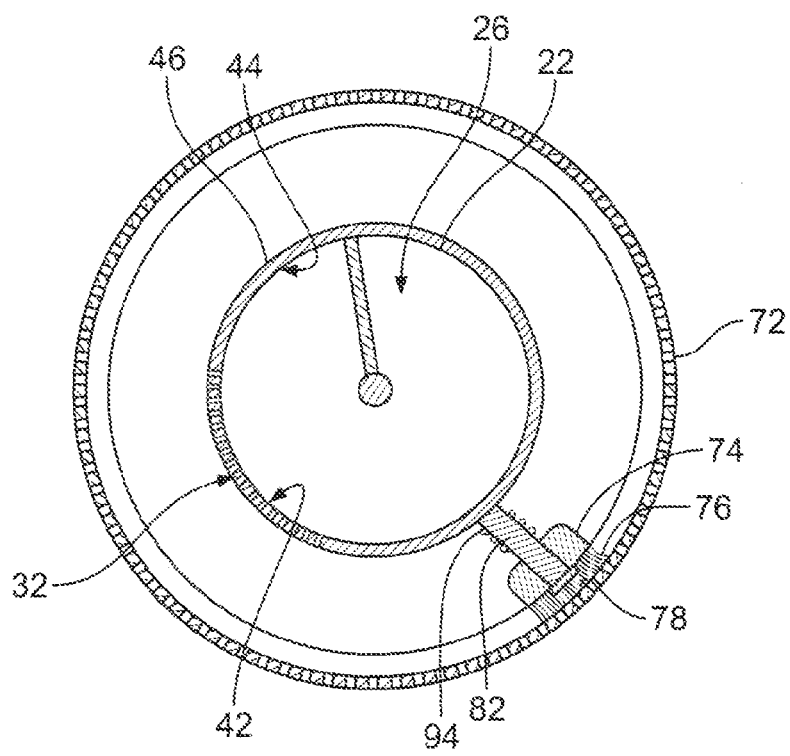
FIG. 4 is a cross-sectional view of an embodiment of the disclosure taken along line 4-4 of FIG. 2.
Figure 5:
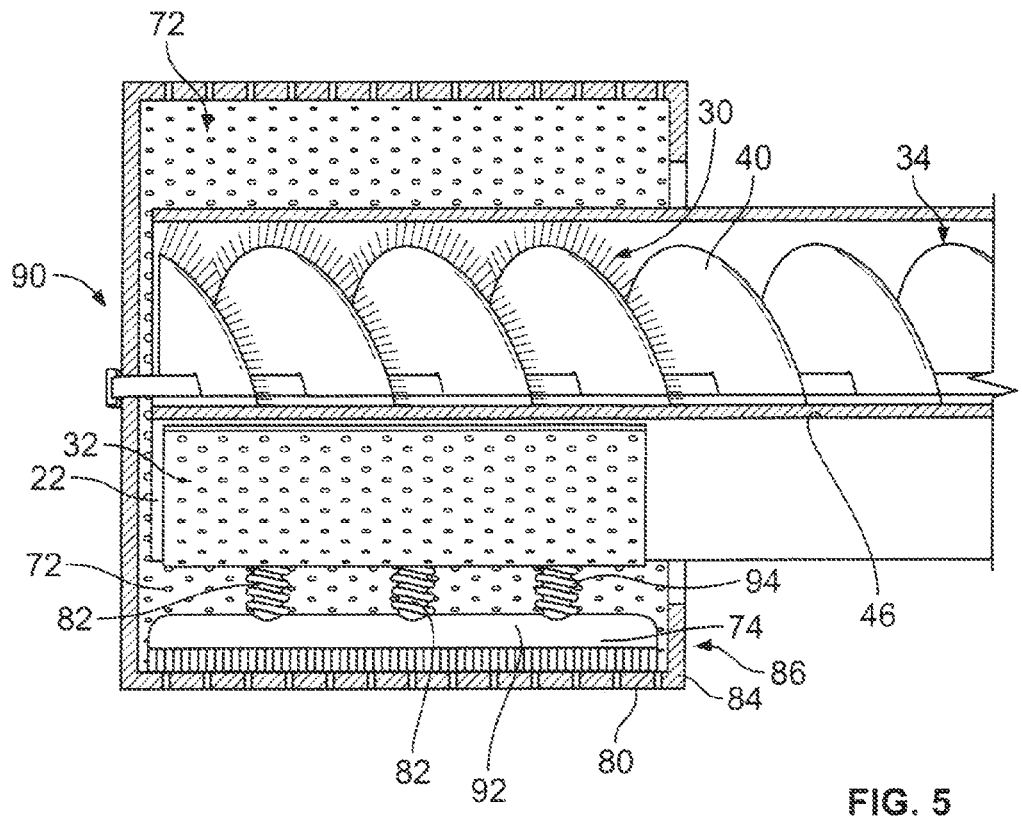
FIG. 5 is a cross-sectional view of an embodiment of the disclosure taken along line 5-5 of FIG. 2.

An auger 26 is positioned in the conduit 22. A motor 28 operationally coupled to the auger 26. Thus, the auger 26 is configured for moving the powder 20 to the dispensing screen 32. The auger 26 may have a bristled portion 30 positioned adjacent to the dispensing screen 24. The bristled portion 30 contacts the dispensing screen 32. Thus, the bristled portion 30 is configured for urging the powder 20 out of the conduit 22 through the dispensing screen 32. The auger 26 may have a non-bristled portion 34 extending between the receiving aperture 24 and the bristled portion 30 of the auger 26. The conduit 22 may have a curved portion 36 between the dispensing screen 32 and the receiving aperture 24. To facilitate use of the auger 26 through the curved portion 36 of the conduit 22, the auger 26 may have a hollow shaft 38, as seen in FIG. 3. The auger 26 also has helical fighting 40 coupled to and extending from the hollow shaft 38.

The dispensing screen 32 may be cylindrical as shown in FIG. 3. An interior surface 42 of the dispensing screen 32 is flush with an interior surface 44 of the conduit 22. Alternately, the dispensing screen 32 may be arcuate. The arcuate dispensing screen 24 is coupled to the conduit 22 in a flush position relative to a wall 46 of the conduit 22.

Figure 2:
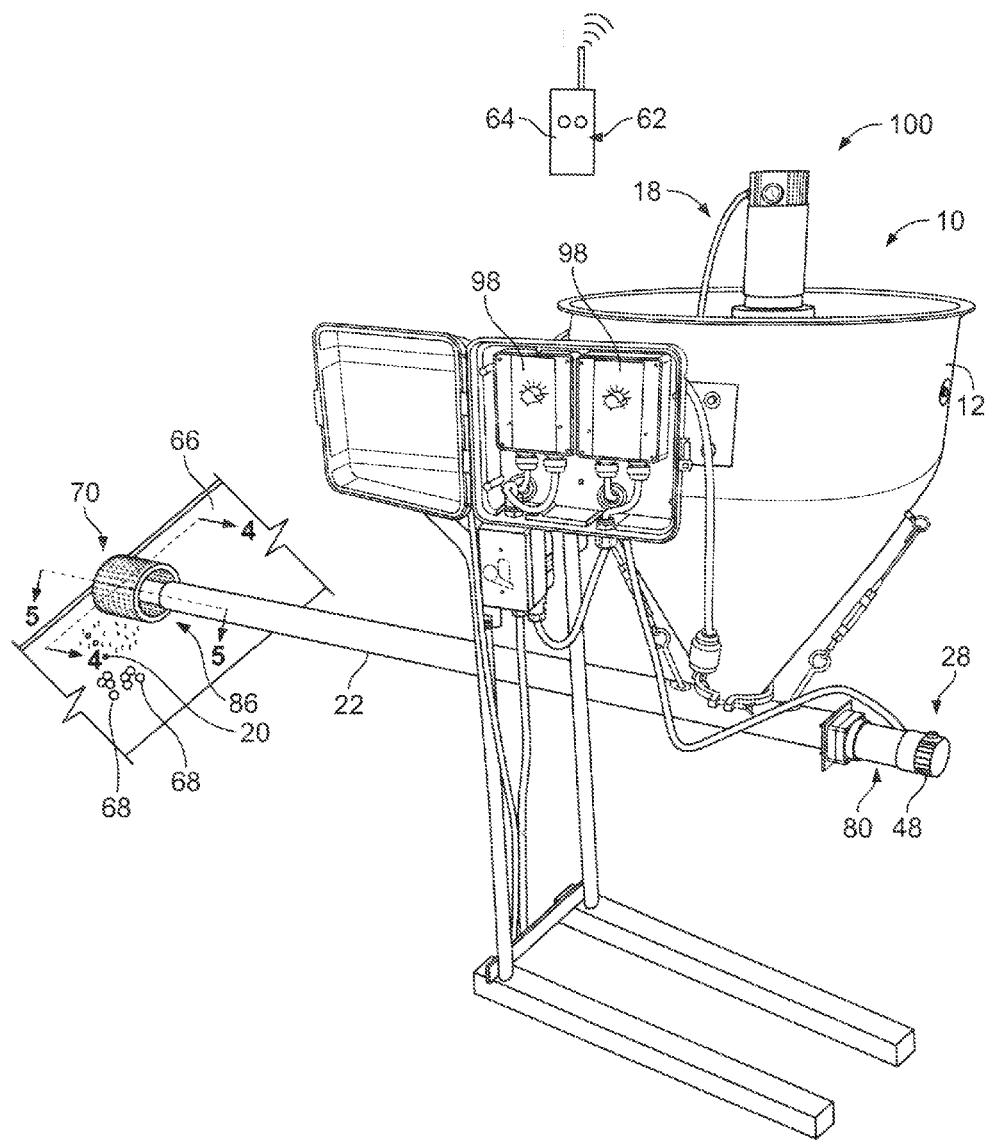
FIG. 2 is a top front side perspective view of an embodiment of the disclosure.
Figure 6:
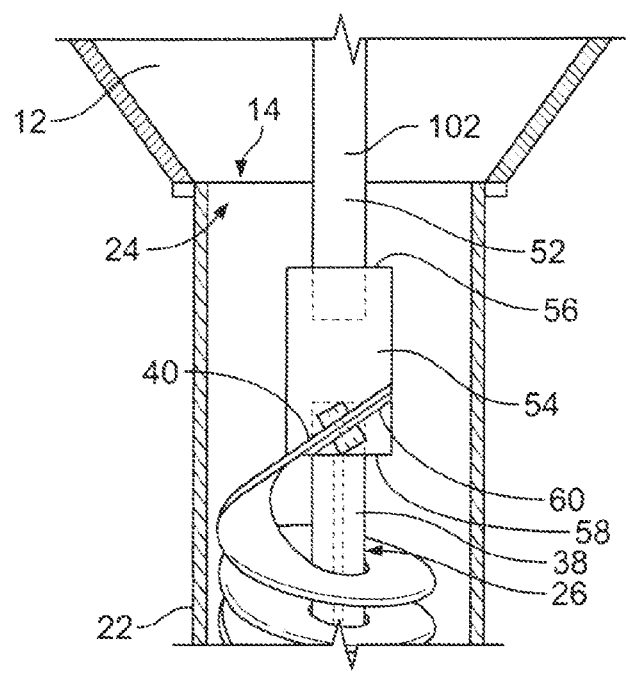
FIG. 6 is a cross-sectional view of an embodiment of the disclosure taken along line 6-6 of FIG. 1.
Figure 7:
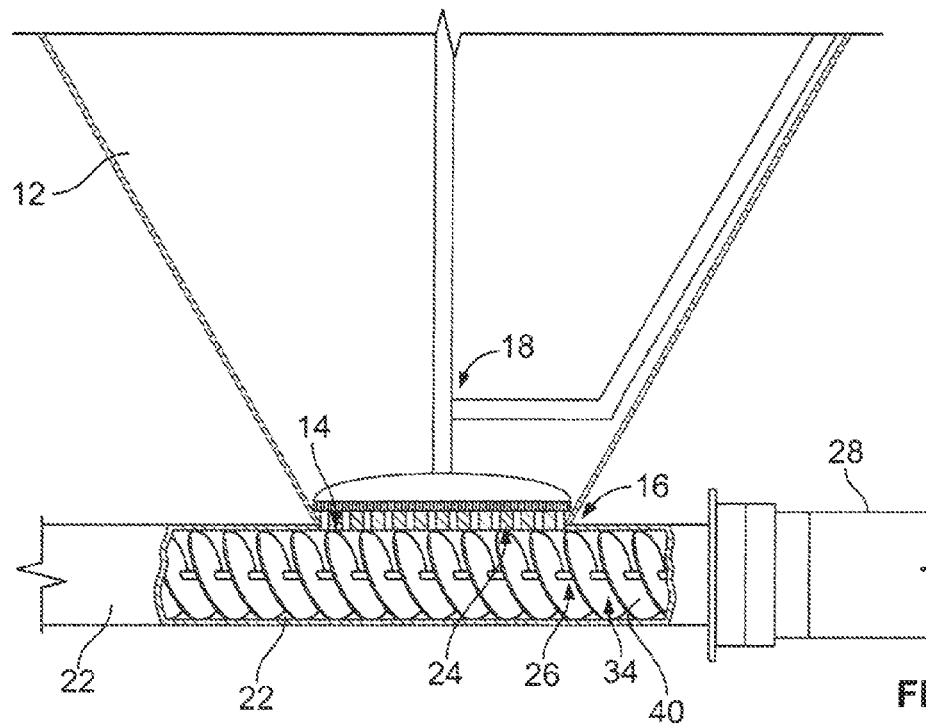
FIG. 7 is a partial cut-away view of an embodiment of the disclosure.
Figure 8:
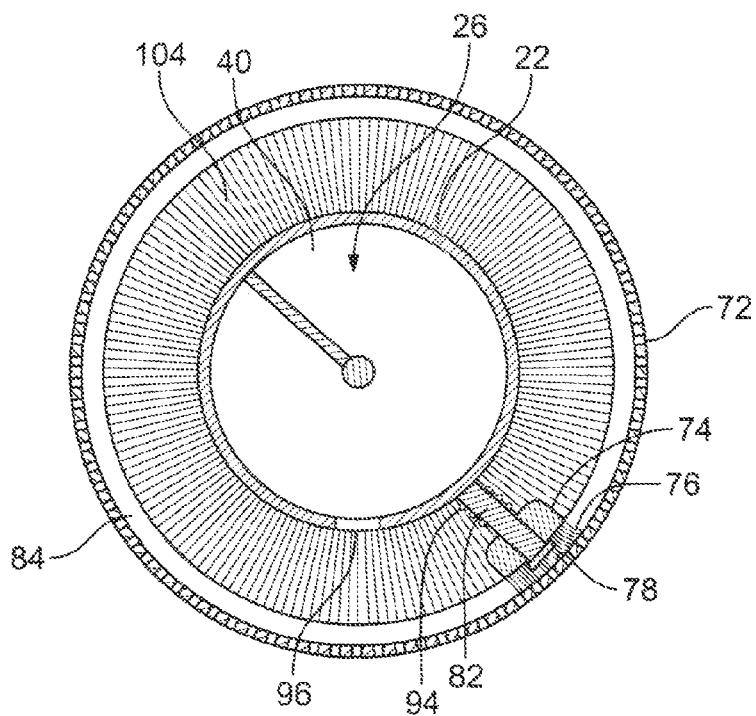
FIG. 8 is a cross-sectional view of an embodiment of the disclosure.

The motor 28 coupled to the auger 26 may be achieved through different alternative structures. The motor 28 may be a separate variable speed motor 48 as shown in the embodiment of FIG. 2. In this embodiment a separate motor 100 is used for the metering assembly 18. Alternatively, a single motor 50 may be used for both the metering assembly 18 and the auger 26 as shown in the embodiment of FIG. 1. Variable speed controls 98 are shown for each motor 48 and 100. As shown in FIGS. 1 and 6, the metering assembly 18 includes a shaft 102 and an auger shaft connection portion 52 extending through the dispensing aperture 14 of the container 12. A coupling member 54 has a first end 56 coupled to the auger shaft connection portion 52 of the metering assembly 18. The coupling member 54 has a second end 58 coupled to the shaft 38 of the auger 26. A bracket 60 is coupled to the coupling member 54. The bracket 60 is coupled to the flighting 40 of the auger 26. The bracket 60 is angled and engages the flighting 40 to distribute torque on the auger 26 to both the shaft 38 and the flighting 40. The motor 50 is operationally coupled to the auger 26 and is operationally coupled to the metering assembly 18 for rotating the auger shaft connection portion 52.

A remote control 62 may be operationally coupled to the motor 28 operationally coupled to the auger 26 for selectively activating and deactivating the auger 26 by manipulation of the remote control 62. The remote control 62 may take the form of a handheld transmitter 64 or the remote control may be achieved through hardwiring the motor 28 into a vehicle or other structure utilizing a switch at a remote location to the motor 28. The switch may be operated by hand or positioned adjacent to a moving mechanical part that operates the switch. The switch may be operated to coordinate activation of the motor 28 with the operation of another device such as a conveyor 66 whereby the assembly 10 and the conveyor work in tandem to disperse the metered powder 20 onto items 68 on the conveyor 66. The items 68, such as seeds, may be passed directly over the dispensing screen 32 for the embodiment of the assembly 10 shown in FIG. 1.

Alternatively, as shown in FIG. 2, a dispersal assembly 70 may be coupled to the conduit 22. The dispersal assembly 70 includes a cylindrical dispersal screen 72 coupled to the conduit 22 adjacent to the dispensing screen 72. Thus, the dispersal screen 72 is configured for receiving the powder 20 dispensed through the dispensing screen 32. The dispensing screen may be incorporated into a basket 88 having a closed end 90 and a lip 84 formed at an open end 86 of the basket 88. The lip 84 may extend a full length towards the conduit 22 to prevent foreign objects from entering the basket 88. Alternately, this may also be achieved by having a gasket or a plurality of bristles 104 extending from either the lip 84 or directly from the dispersal screen 72. The dispersal screen 72 is movable relative to the conduit 22. A dispensing brush 74 is coupled to and extends from the conduit 22. The dispensing brush 74 has a plurality of bristles 76. Distal ends 78 of the bristles 76 relative to the conduit 22 are positioned in contact with the dispersal screen 72. The dispersal screen 72 is operationally coupled to a motivator 80 that rotates the dispersal screen 72 around the conduit 22 when the motivator 80 is activated. The dispersal screen 72 may be axially aligned with and mechanically coupled to the auger 26 whereby the Motivator 80 is the motor 28 operationally coupled to the auger 26.

The dispensing brush 74 includes at least one post 82 coupled to the conduit 22 but may have a plurality of such posts 82 which may be aligned with axes of the dispensing brush 74, the auger 26 and the conduit 22. A head portion 92 is slidably coupled to the posts 82 with the bristles 76 extending from the head portion 92. A biasing member 94 is coupled to each post between the conduit 22 and the head portion 92. The biasing members 94 urge the distal ends 78 of the bristles 76 into contact with the dispersal screen 72. Thus, the powder 20 is urged through the dispersal screen 72 by the bristles 76. The dispensing brush 74 may be oriented to extend from the conduit 22 at an acute angle from vertical and the basket 88 is rotated to catch the powder 20 and move the powder 20 towards the dispensing brush 74 as shown in FIG. 4.

In an embodiment shown in FIG. 8, the dispensing screen 32 shown in FIG. 4 may be replaced by a single dispensing opening 96. This is effective but the inclusion of the dispensing screen 32 coupled to the conduit 22 in the dispensing opening 96 provides an additional opportunity for sifting of the powder 20 to insure even distribution and efficient use of the powder 20. The metering of the powder 20 may occur through the dispensing aperture 14 of the container 12 by way of the metering assembly 18. Alternatively, metering occurs through the dispensing screen 32 alone if the metering assembly 18 is not utilized in the container 12.

In use, the assembly 10 meters and distributes the powder 20 in an even and efficient manner even in high humidity conditions. This may be applied to applications within a factory or by mounting the assembly 10 directly on a vehicle such as a seed conveyor. The assembly 10 provides multiple points of sifting of the powder 20 to insure even and efficient distribution of the powder 20. One particular application of the assembly 10 is dispensing powdered seed treatment directly onto seeds by passing the seeds over the dispensing screen 32. Alternatively, the dispersal assembly 72 may be used to disperse the powder over items 68 passing beneath the dispersal assembly 72.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A powder metering and dispensing assembly for dispensing a powder, said assembly comprising:

- a container configured for holding the powder, said container having a dispensing aperture;
- a metering assembly coupled to and positioned in said container for metering and dispensing the powder from said container through said dispensing aperture;
- a conduit coupled to said container, said conduit having a receiving aperture in environmental communication with said dispensing aperture of said container whereby said conduit is configured to receive the powder dispensed through said dispensing aperture;
- a dispensing screen coupled to said conduit, said dispensing screen being configured for dispensing the powder from said conduit;
- an auger positioned in said conduit;
- a motor operationally coupled to said auger whereby said auger is configured for moving the powder to said dispensing screen; and
- a dispersal assembly coupled to said conduit, said dispersal assembly comprising
  - a dispersal screen coupled to said conduit adjacent to said dispensing screen whereby said dispersal screen is configured for receiving the powder dispensed through said dispensing screen, said dispersal screen being movable relative to said conduit,
  - a dispensing brush coupled to and extending from said conduit, said dispensing brush having a plurality of bristles, distal ends of said bristles relative to said conduit being positioned in contact with said dispersal screen, and
  - said dispersal screen being operationally coupled to a motivator whereby said dispersal screen moves relative to said conduit when said motivator is activated.

2. The assembly of claim 1, wherein said dispersal screen is cylindrical.

3. The assembly of claim 2, wherein said dispersal screen is rotated around said conduit by said motivator.

4. The assembly of claim 3, wherein said dispersal screen is mechanically coupled to said auger whereby said motivator is said motor operationally coupled to said auger.

5. The assembly of claim 1, wherein said dispensing brush further comprises:

a post coupled to said conduit;

a head portion slidably coupled to said post, said bristles extending from said head portion; and a biasing member coupled to said post between said conduit and said head portion, said biasing member urging said distal ends of said bristles into contact with said dispersal screen.

6. The assembly of claim 1, wherein said dispensing brush further comprises:

a plurality of aligned posts coupled to said conduit;

a head portion slidably coupled to each of said posts, said bristles extending from said head portion; and a plurality of biasing members, each biasing member being coupled to an associated one of said posts between said conduit and said head portion, said biasing members urging said distal ends of said bristles into contact with said dispersal screen.

7. The assembly of claim 1, further including said auger having a bristled portion positioned adjacent to said dispensing screen, said bristled portion contacting said dispensing screen whereby said bristled portion is configured for urging the powder out of said conduit through said dispensing screen.

8. The assembly of claim 7, further including said auger having a non-bristled portion extending between said receiving aperture and said bristled portion of said auger.

9. The assembly of claim 1, further including said conduit having a curved portion between said dispensing screen and said receiving aperture.

10. The assembly of claim 9, wherein said auger comprises a hollow shaft and helical flighting coupled to and extending from said shaft, said helical flighting extending along a length of said shaft.

11. The assembly of claim 1, further comprising:

said conduit being tubular; and wherein said dispensing screen is cylindrical, an interior surface of said dispensing screen being flush with an interior surface of said conduit.

12. The assembly of claim 1, further comprising:

said conduit being tubular; and wherein said dispensing screen is arcuate, said dispensing screen being coupled to said conduit in a flush position relative to a wall of said conduit.

13. The assembly of claim 1, wherein said motor coupled to said auger is a variable speed motor.

14. The assembly of claim 10, further comprising:

said metering assembly including an auger shaft connection portion extending through said dispensing aperture of said container;

a coupling member having a first end coupled to said auger shaft connection portion of said metering assembly, said coupling member having a second end coupled to said shaft of said auger; and a bracket coupled to said coupling member, said bracket being coupled to said helical flighting of said auger.

15. The assembly of claim 14 wherein said motor operationally coupled to said auger is operationally coupled to said metering assembly for rotating said auger shaft connection portion.

16. The assembly of claim 1, further including a remote control operationally coupled to said motor operationally coupled to said auger for selectively activating and deactivating said auger by manipulation of said remote control.

17. A powder metering and dispensing assembly for dispensing a powder, said assembly comprising:

a container configured for holding the powder, said container having a dispensing aperture, said container having a dispensing aperture, said dispensing aperture being configured for passing the powder from said container;

a conduit coupled to said container, said conduit having a receiving aperture in environmental communication with said dispensing aperture of said container whereby said conduit is configured to receive the powder dispensed through said dispensing aperture, said conduit having a dispensing opening;

an auger positioned in said conduit; and a motor operationally coupled to said auger whereby said auger is configured for moving the powder to said dispensing opening; and a dispersal assembly coupled to said conduit, said dispersal assembly comprising a dispersal screen coupled to said conduit adjacent to said dispensing opening whereby said dispersal screen is configured for receiving the powder dispensed through said dispensing opening, said dispersal screen being movable relative to said conduit, a dispensing brush coupled to and extending from said conduit, said dispensing brush having a plurality of bristles, distal ends of said bristles relative to said conduit being positioned in contact with said dispersal screen, and said dispersal screen being operationally coupled to a motivator whereby said dispersal screen moves relative to said conduit when said motivator is activated.

18. The assembly of claim 17, further comprising:

a dispensing screen coupled to said conduit in said dispensing opening; and said auger including a bristled portion positioned adjacent to said dispensing screen, said bristled portion contacting said dispensing screen whereby said bristled portion is configured for urging the powder out of said conduit through said dispensing screen.

\* \* \* \* \*